US012054338B2

(12) United States Patent
Spiwak

(10) Patent No.: US 12,054,338 B2
(45) Date of Patent: Aug. 6, 2024

(54) APPARATUS AND METHOD FOR STORING GARBAGE OUTDOORS

(71) Applicant: Brian J. Spiwak, Sugar Land, TX (US)

(72) Inventor: Brian J. Spiwak, Sugar Land, TX (US)

(*) Notice: Subject to any disclaimer, the term of this patent is extended or adjusted under 35 U.S.C. 154(b) by 1020 days.

(21) Appl. No.: 16/672,457

(22) Filed: Nov. 2, 2019

(65) Prior Publication Data

US 2020/0140192 A1 May 7, 2020

Related U.S. Application Data

(60) Provisional application No. 62/754,856, filed on Nov. 2, 2018.

(51) Int. Cl.
*B65F 1/14* (2006.01)
*B65F 1/00* (2006.01)
(Continued)

(52) U.S. Cl.
CPC ............ *B65F 1/1426* (2013.01); *B65F 1/006* (2013.01); *B65F 1/06* (2013.01); *B65F 1/08* (2013.01);
(Continued)

(58) Field of Classification Search
CPC ... A01G 9/02; B65F 1/00; B65F 1/006; B65F 1/06; B65F 1/1426; B65F 1/16; B65F 1/1623; B65F 2210/132; B65F 2230/135; B65F 2240/136; B65F 1/08; B65F 2210/135
USPC .......... 206/136, 248, 557, 567, 907, 0.5, 37, 206/63.5, 96, 204, 205, 210, 219, 222, 206/223, 232, 233, 242, 246, 259, 261, 206/264, 268, 271, 273, 276, 292, 303, 206/308.1, 308.3, 315.11, 316.2, 361, 206/363, 364, 365, 366, 368, 369, 370, 206/371, 373, 380, 386, 389, 390, 397, 206/404, 407, 408, 409, 411, 419, 425, 206/427, 438, 443, 446, 455, 459.1, 206/459.5, 460, 462, 463, 470, 472, 478,
(Continued)

(56) References Cited

U.S. PATENT DOCUMENTS 4,418,835 A * 12/1983 Watts ................ B65F 1/06 220/495.1
6,474,495 B1 * 11/2002 Frei ................. B65F 1/06 220/495.08
(Continued)

FOREIGN PATENT DOCUMENTS

CN 107032009 A * 8/2007 .............. B65F 1/006
CN 107032009 A * 8/2017 .............. B65F 1/006
(Continued)

*Primary Examiner* — Anthony D Stashick
*Assistant Examiner* — Marcos Javier Rodriguez Molina
(74) *Attorney, Agent, or Firm* — Gary Katz; Katz Law Group, LLC

(57) ABSTRACT

A storage container that is suitable for storing waste outdoors, including pet waste is described. The storage container has a smaller container inside a large container with a lid the fits over and interior lip or the exterior of the outer container. In one embodiment, a method for storing waste is disclosed by using an inner container inside a larger outer container with a lid that may have an item on top that can serve as a decorative item as well as a handle. A method for using this device is detailed as well as a method of manufacturing the device.

30 Claims, 3 Drawing Sheets

(51) Int. Cl.
*B65F 1/06* (2006.01)
*B65F 1/08* (2006.01)
*B65F 1/16* (2006.01)
*A01G 9/02* (2018.01)

(52) U.S. Cl.
CPC .................. *B65F 1/16* (2013.01); *A01G 9/02* (2013.01); *B65F 2210/135* (2013.01); *B65F 2230/135* (2013.01); *B65F 2240/136* (2013.01)

(58) Field of Classification Search
USPC ....... 206/484, 496, 503, 504, 507, 508, 509,
206/514, 515, 519, 521, 522, 523, 524.1,
206/524.2, 524.3, 524.5, 524.6, 524.7,
206/541, 564, 570, 572, 581, 583, 586,
206/589, 591, 592, 593, 594, 600, 711,
206/733, 753, 809, 811, 813, 814, 830,
206/831; 4/470, 476; 49/273; 220/1.5,
220/4.01, 4.09, 4.21, 4.23, 4.26, 4.28,
220/4.29, 4.32, 6, 7, 8, 9.4, 23.4, 23.8,
220/23.83, 23.86, 23.87, 23.88, 23.89,
220/23.91, 62, 62.14, 62.15, 62.18, 62.21,
220/62.22, 86.1, 87.1, 88.1, 89.1, 200,
220/203.06, 203.11, 203.29, 210, 211,
220/212, 212.5, 229, 246, 253, 254.1,
220/254.2, 254.3, 254.6, 255, 258.2,
220/258.3, 259.2, 259.4, 260, 262, 263,
220/264, 268, 283, 288, 315, 318, 319,
220/323, 324, 326, 366.1, 369, 373, 374,
220/375, 378, 379, 380, 475, 476, 477,
220/481, 484, 485, 493, 494, 495.02,
220/495.03, 495.04, 495.05, 495.06,
220/495.07, 495.08, 495.09, 495.1,
220/495.11, 500, 502, 503, 505, 506, 507,
220/521, 522, 523, 524, 528, 529, 532,
220/533, 553, 560.01, 563, 567.1, 570,
220/571, 573, 574, 576, 578, 586, 592.03,
220/592.14, 592.16, 592.19, 592.2, 601,
220/602, 610, 623, 625, 626, 628, 629,
220/630, 632, 643, 649, 659, 660, 662,
220/663, 668, 675, 676, 677, 678, 693,
220/694, 703, 708, 710, 714, 715, 737,
220/738, 739, 740, 744, 752, 754, 756,
220/759, 761, 768, 771, 772, 775, 776,
220/780, 783, 784, 786, 787, 789, 793,
220/810, 812, 819, 825, 826, 827, 830,
220/831, 832, 835, 840, 843, 845, 849,
220/902, 906, 908, 908.1, 908.2, 908.3,
220/909, 912, 913, 918, 920, DIG. 13,
220/DIG. 14, DIG. 27, DIG. 8, FOR. 153;
222/48, 94, 95, 96, 105, 129.4, 131,
222/146.2, 153.03, 171, 183, 189.07, 192,
222/209, 212, 309, 321.1, 321.7, 321.9,
222/386.5, 387, 389, 390, 398, 400.8,
222/402.1, 402.22, 402.24, 541.1, 553,
222/570; 248/907; 414/303, 387, 407,
414/409, 411, 414, 527, 528, 573

See application file for complete search history.

(56) References Cited

U.S. PATENT DOCUMENTS

2004/0200834 A1* 10/2004 Evanko .................. A41G 1/001
220/200
2006/0213786 A1* 9/2006 Walser ..................... A41G 1/00
47/41.11

FOREIGN PATENT DOCUMENTS

| CN | 107032009 A | * | 8/2017 | ............. B65F 1/006 |
|---|---|---|---|---|
| CN | 107416388 A | * | 12/2017 | ............ B65F 1/1426 |
| EP | 1260456 A1 | * | 11/2002 | ............. B65F 1/006 |
| EP | 1260456 A1 | * | 11/2002 | ............. B65F 1/006 |
| GB | 2483302 A | * | 3/2012 | ............. B65F 1/141 |
| KR | 20070011653 A | * | 1/2007 | ............... B65F 1/14 |
| KR | 101904694 B1 | * | 10/2018 | ............... B65F 1/16 |

* cited by examiner

APPARATUS AND METHOD FOR STORING GARBAGE OUTDOORS

CROSS REFERENCE TO RELATED APPLICATIONS

The present application is a United States Non-Provisional Patent Application that claims priority to U.S. Patent Application Ser. No. 62/754,856, entitled "APPARATUS AND METHOD FOR STORING GARBAGE OUTDOORS" filed on Nov. 2, 2018, which is incorporated in its entirety by reference

TECHNICAL FIELD

The present disclosure generally relates to the field of container storage. More specifically, the present disclosure relates to the field of waste storage. Most specifically, embodiments the present disclosure relates to the field of pet waste storage.

BACKGROUND

It is important to store items, including garbage, properly. For example, pet owners must dispose of waste properly to avoid or at least reduce odors and possible diseases. Responsible pet ownership requires curbing pets, especially dogs, and disposing of the waste responsibly. Often people dispose of pet waste into an outside trash can. These outside trash cans can be unsightly, often emit odors and can be a health hazard. Some pet owners will hide the unsightly trash can behind landscaping, behind the house or behind a fence. This makes access to the trash can more difficult, can led to miss throws into the cans, and does not solve odor issues. In addition, Homeowners Associations (HOAs) often prohibit pet owners from storing a trash can within sight of the street. The mechanisms of trash cans with mechanical lids often become unreliable, which can further compound the problem. There is a need to store waste including pet waste outdoors in a neat and slightly manner that reduces odors. Accordingly, embodiments of this invention solve these needs.

BRIEF SUMMARY

The present disclosure is directed to devices and methods for properly storing items and garbage outside, including pet waste. The apparatus involves means to store the trash, means to vent noxious odors and means to remove the trash from the container and means to hide the trash from street. The method involves steps to store the trash, steps to address noxious odors, steps to remove the trash from the containers and steps to hide or camouflage the trash from the street.

BRIEF DESCRIPTION OF THE DRAWINGS

For a more complete understanding of the disclosed methods and apparatuses, reference should be made to the embodiments illustrated in greater detail in the accompanying drawings, wherein.

The drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the embodiments illustrated herein.

DETAILED DESCRIPTION

Below is a description of various embodiments of the invention. Before describing selected embodiments of the present disclosure in detail, it is to be understood that the present invention is not limited to the embodiments described herein. The disclosures and descriptions herein are illustrative and explanatory of one or more presently preferred embodiments and variations thereof. It will be appreciated by those skilled in the art that various changes in the design, organization, means of operation, structures and location, methodology, and use of mechanical equivalents may be made without departing from the spirit of the invention.

The drawings are intended to illustrate and plainly disclose presently preferred embodiments to one of skill in the art but are not intended to be manufacturing level drawings or renditions of final products. These may include simplified conceptual views to facilitate understanding or explanation. In addition, the relative size and arrangement of the components may differ from that shown and still operate within the spirit of the invention.

Moreover, various directions such as "upper", "lower", "bottom", "top", "left", "right", "first", "second" and so forth are made only with respect to explanation in conjunction with the drawings. The inventive components may be oriented differently, for instance, during transportation, manufacturing and operations. Numerous varying and different embodiments and modifications may be made within the scope of the concept(s) embodiments herein as taught and described below. Therefore, it is to be understood that the details herein are to be interpreted as illustrative and non-limiting. For example, many embodiments and examples are used to describe storing pet waste outdoors. However, the invention can be used to handle any type of storage containers.

Figure 1:
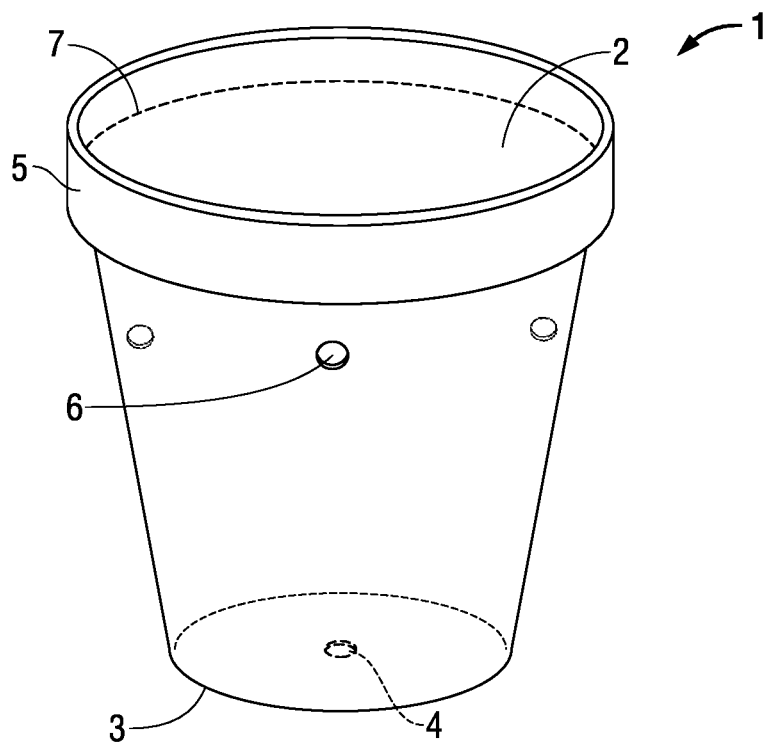
FIG. 1 illustrates an outer container according to embodiments of the invention.

FIG. 1 illustrates a flowerpot suitable to be outdoors. As shown in FIG. 1, the outer container 1, in this case, a flowerpot, has enough size to store items inside the vessel or cavity 2 of the outer container 1. The outer container 1 has a base 3 on one end with a drain 4 or hole on the base 3. On the other end of the flowerpot 1, there can be an optional rim 5 inside and/or outside around the circumference. One or more off-gassing or vent holes 6 can be drilled or designed into the outer housing or outer container 1. Preferably, there are a plurality of holes in the outer container, of up to 6 holes, to allow for quicker off-gassing. In one embodiment, there are least 3 holes at 120 degrees angles to each other. Most preferably, four holes are manufactured or drilled at 90-degree angels to each other on the circumference allowing for quick and even distribution on the off-gassing and odor control. If the holes are too small there will not be enough off-gassing and if the holes are too big, water and other particles can get into the container. The holes should be at least ⅛ inch (0.3175 centimeters) and no larger than 2-inch (5.08 centimeters) diameters. Preferably, the holes would be at least 14 inch (0.635 centimeters) and no larger than 1-inch (2.54 centimeters) diameter.

Figure 2:
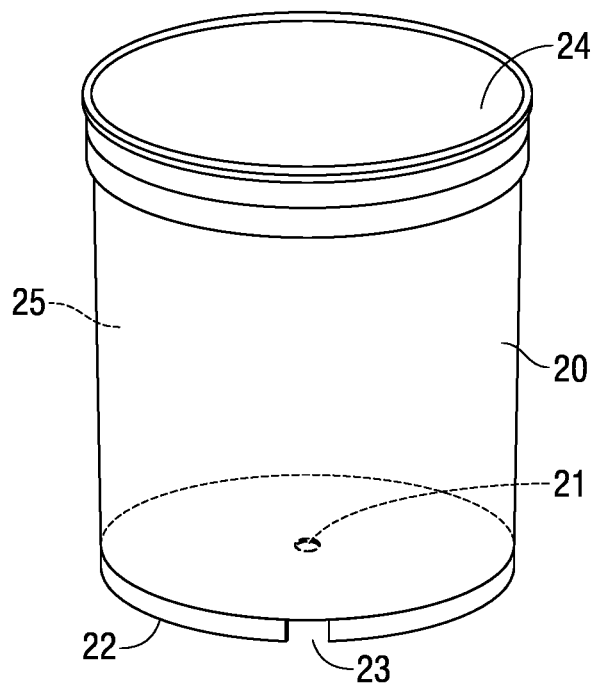
FIG. 2 illustrates an inner container according to embodiments of the invention.
Figure 5:
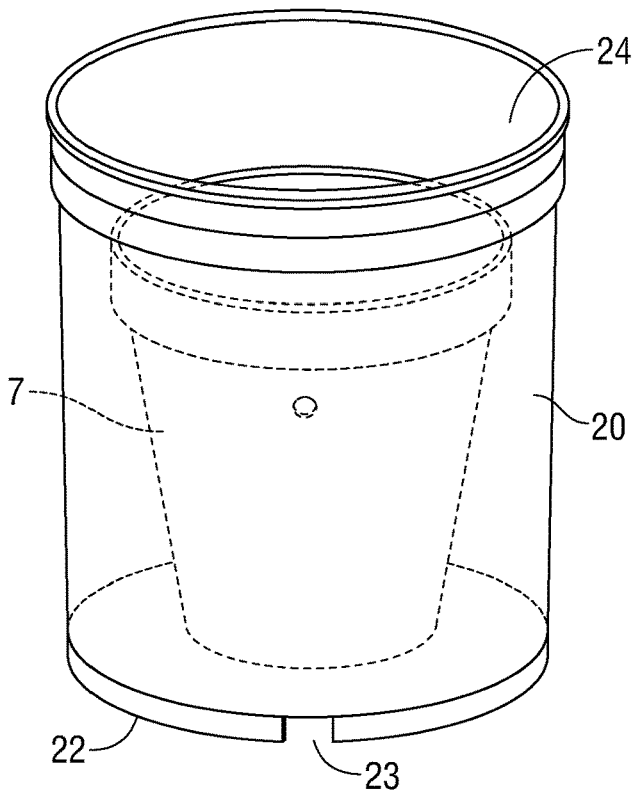
FIG. 5 illustrates a second container inside a first container embodiment.

FIG. 2 illustrates an inner container 20 or nursery container or smaller flowerpot that is smaller than the outer container 1 in FIG. 1. Similar to FIG. 1, the inner container has an interior space for storing items. On one end of the outer container 20 is pre-cast or drilled drained holes 21 and/or slots 21 which forms the base 22 or bottom of the inner container 20. The inner container typically has an open top 24 forming a vessel 25 or cavity inside the inner container 20 below. This inner container 20 is small enough to fit inside the outer container 1 or larger flowerpot in FIG. 1 as shown in FIG. 5. Preferably, there should be enough space between the outer circumference of the inner container 20 and the inner circumference of the outer container 2, to easily fit a small plastic bag, from the grocery store or small garbage bag. If the storage container is large enough, a full-size garbage bag can be used. The gap between the inner container and the outer container should be at least ½ inch (1.27 centimeters) to no more than 4 inches (10.16 centimeters) and preferably at least 1 inch (2.54 centimeters) and no more than 3 inches (7.62 centimeters) and most preferably at least 2 inches (5.08 centimeters) and no more than 3 inches (7.62 centimeters). Both the outer container and the inner container should have at least one hole and preferably at least two holes and most preferably at least four holes on the bottom for drainage.

Figures 3, 4:
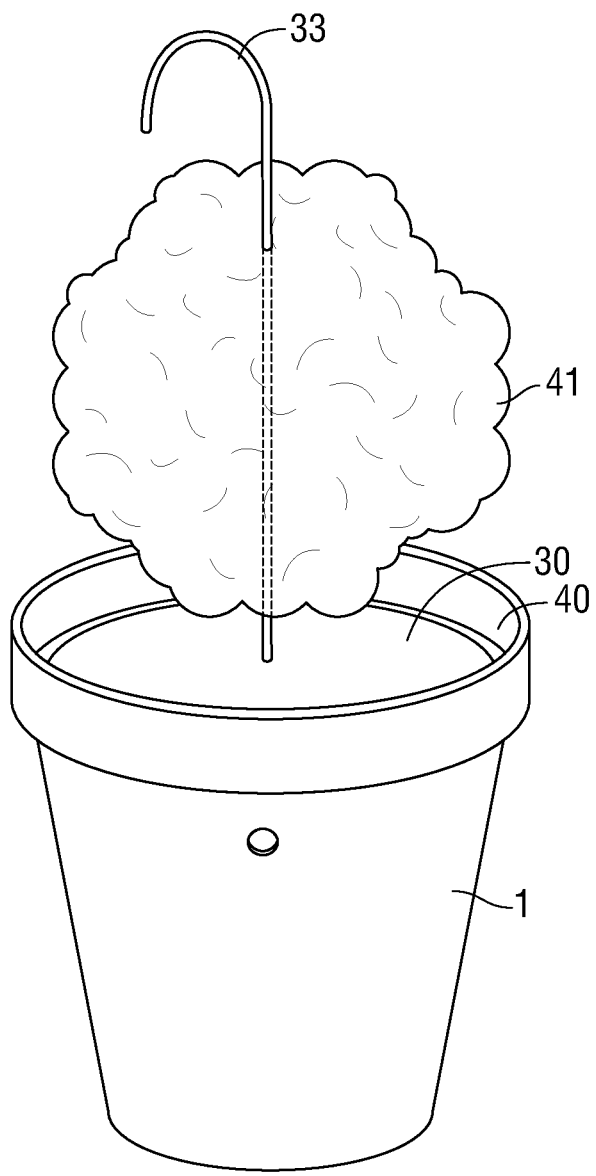
FIG. 3 illustrates a lid according to embodiments of the invention.
FIG. 4 illustrates an exterior of the storage device according to embodiments of the invention.

FIG. 3 illustrates a lid 30 embodiment. The lid 30 or the top placed on the rim 5 of the outer container 1 or outer flowerpot can be an inverted drain saucer of a matching flowerpot to form the lid 20, that is removeable, as shown in FIG. 3. In one embodiment the lid 30 fits outside the or top or outer rim 5 of the outer container 1 or the inner rim 7, as shown in FIG. 1. Alternatively, the lid 30 or inverted drip saucer from a flowerpot can fit inside the flowerpot. In this embodiment, the slopped shape of the flowerpot and/or the inner rim 7 enables the lid to fit inside yet remains securely near the top portion of the outer container. The slope of the outer wall of the flowerpot should be designed to hold the inverted saucer at a height substantially near the top of the flowerpot. This means that the lid is closer to the top than the bottom of the outer container. Preferably, the lid 30 or inverted saucer should be at least 2 inches (5.08 centimeters) and most preferably at least one inch (2.54 centimeters) from the top end of the outer container 1 and most preferably at ½ inch (1.27 centimeters) but no more than 1 inch (2.54 centimeters) from the top of the flowerpot. One or more optional color coordinated handles (shown as 33 in FIG. 4) can be added to the lid. The handle can be a handle or a wire bent into a shape of a handle and attached to the lid. The handles allow for easily removable and can be ergonomically designed to allow for removable with just one hand. This handle and can be conveniently obscured from view to hide the fact the lid is removable to keep the aesthetics of the plant. The fake plant or tree should preferably substantially cover or cover the majority of lid. Preferably the fake plant or tree 41 covers the entire lid and the outer container from the top.

FIG. 4. shows a picture of the assembled device 40 showing a fake plant 41 attached to the top of the outside exterior wall of the lid inside the outer container 1 or the flowerpot. The fake plant 41 can be replaced with anything ornamental to hide the storage container. The smaller inner container (shown as 7 in FIG. 5) or smaller nursery pot is inside the outer container 1. Preferably, a plastic bag (not shown) is in the space inside the inner container or nursery pot and part of the plastic bag (not shown) is between the outer container and the inner container (not shown). This assembled product can be referred to a pot-T-plant pet disposal container as shown in FIG. 5.

FIG. 5 closely resembles FIG. 1 with similar elements receiving the same reference numerals. FIG. 5 illustrates the or smaller nursery pot 7 inside the outer container 1. The nursery pot allows removal of the bag with the pot to avoid spillage and other issues during insertion and removal. The inner container or nursey pot can be attached or sit freely on the inside bottom 3 of outer container 1.

Method

Figure 6:
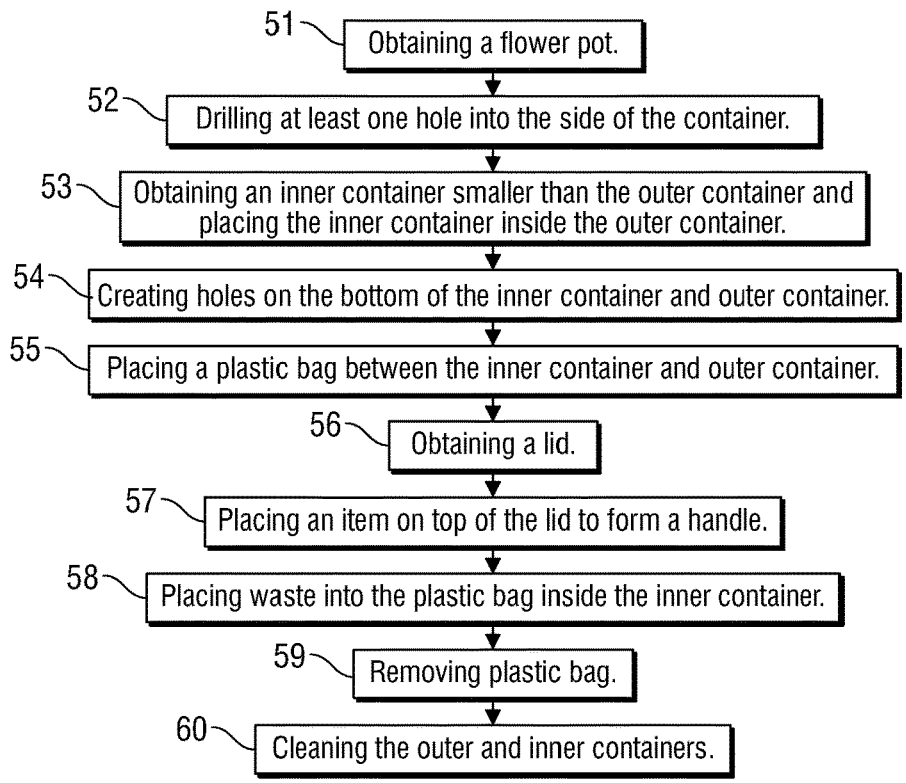
FIG. 6 illustrates a method embodiment of the invention.

FIG. 6 is a flow chart 50 showing a method embodiment of the invention. First an outer container 1, which can be a flowerpot is obtained 51. If necessary, one or more drainage hole can be drilled on the bottom and one or more holes are drilled into the side walls of the exterior housing 1, as needed. In one embodiment, one or more holes or openings can be drilled or designed into the sloped side walls of the flowerpot for facilitating off-gassing 52.

Next, an inner continuer smaller than the outer container is obtained and the inner container is placed inside the outer container 53. If necessary, holes or slots are drilled or cut into the bottom of the inner container and one or more holes are drilled into the sloped side walls of the exterior of the inner container 20, as needed 54. A plastic bag may be placed between the inner container and outer container 55. Next, a lid such as, an inverted saucer that can fit onto the flower part is obtained 56. A decorative item can be placed on the top of the lid 20 or saucer that can form a handle 57. Preferably, the decorative item includes a fake plant that is designed to direct attention away from the container by creating a visual distraction with a decorative item or camouflaging the outdoor storage container. The secured decorative item on top of the lid or inverted saucer can serve as a handle for removing and storing the lid (inverted saucer) 30 on the outer container. Waste such as, pet waste can be thrown into the plastic bag inside the inner container 58. The bag can be removed when necessary 59. The inner and outer container can be cleaned with a standard industrial or household cleaner such as, ammonia-based products, to reduce odor or dieses, as needed 60. In one embodiment, the inner container can be a smaller flower placed or nursey pot inside a larger pot. The inner container can be secured to the outer container or placed inside without securing it to permit simple removable of the inner container. Other securing option including using clips tape or removable screws.

Example

In the example shown in FIG. 1 the base can have a diameter of 9 inches with the drain on the bottom being approximately ⅜ inches. The at least one off-gassing holes are preferably drilled or designed at 90 degrees or 4 equal distant holes around the circumference. Alternatively, 3 holes can be design at 120 degrees or 3 equal distant holes around the circumference.

The top portion of the flower is 16 inches wide with a ⅜ inner ridge. The inner container 20 or nursery container shown in FIG. 2 can have a ten-inch top portion and a smaller bottom portion with either pre-cast or drilled drainage holes and slots which can be larger than ⅛ inch and less than 1 inch and is preferably larger than ⅜ inches. The lid 30 or inverted drip saucer in this example has a radius of approximately 14⅛ inch. Preferably, the top is not fastened to the container to permit quick removal. However, if the top needs to be secured, fasteners such as, clips, screws and other fastening devices can be used.

In one embodiment, an artificial plant is mounted on the top to transform the waste storage container device into an ordinary looking fake garden plant for aesthetic purposes. Theoretically, a live plant can be placed on the lid 30, if needed. The top can also have a color coordinated handle for easily lifting of the top. This system can come in a variety of sizes and has multiple uses and have multiple designs for camouflaging the device being used as a storage container.

Although the embodiments of the present disclosure and their advantages have been described in detail. However, there are changes, substitutions and alterations can be made herein without departing from the spirit and scope of the disclosure as defined by the appended claims. Moreover, the scope of the present application is not intended to be limited to the embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A storage apparatus comprising:
an outer container with a cavity inside the outer container, wherein the outer container comprises a base with a drain, wherein the drain is a hole on the base and the base is located on lowermost portion of the outer container;
an inner container that is smaller than the outer container is placed completely inside the cavity of the outer container, wherein the inner container comprises at least one hole on a bottom for drainage, wherein the bottom is the lowermost portion of the inner container; and
a removeable lid that fits directly on the outer container while the inner container is inside the outer container and the removeable lid conceals the cavity in the outer container.

2. The storage apparatus of claim 1, further comprising a plastic bag inside the inner container; and an ornamental tree that is attached to the removeable lid to substantially cover top of the removeable lid.

3. The storage apparatus of claim 2, further comprising at least one handle attached to the removeable lid and a gap between the inner container, and the outer container, and the gap between the inner container and the outer container is at least ½ inch and no more than 4 inches to easily fit the plastic bag, wherein a portion of plastic bag can fit between the inner container and an inner circumference of the outer container.

4. The storage apparatus of claim 3, wherein at least a portion of the handle is inside the ornamental tree and the inner container is secured to the outer container with a fastener.

5. The storage apparatus of claim 4, wherein the fastener is a screw and the outer container is a flowerpot and the removeable lid is an inverted saucer pan for the flowerpot and the inner container is a nursey pot.

6. The storage apparatus of claim 2, further comprising a plurality of holes in a side wall of the outer container, wherein the holes allow for quicker off-gassing of items in the cavity and wherein part of the plastic bag is between the outer container and the inner container, wherein the side wall is above the base.

7. The storage apparatus of claim 4, wherein a plurality of holes are least 3 holes at 120 degrees angles to each other in a side wall of the outer container and wherein the fastener is a removeable screw.

8. The storage apparatus of claim 6, wherein the plurality of holes are four holes at 90-degree angles to each other on a circumference of the side wall allowing for quick and even distribution on the off-gassing and odor control and wherein the removeable lid is at least one inch from a top end of the outer container.

9. A method of storing waste, comprising:
(a.) obtaining a storage containercomprising an outer containerwith a cavity inside the outer container, wherein the outer container comprises a base with a drain, wherein the drain is a hole on the base and the base is located on lowermost portion ofthe outer container; an inner container that is smaller than the outer container is placed completely inside the cavity of the outer container, wherein the inner container comprises at least one hole on the bottom for drainage, wherein the bottom is the lowermost portion of the inner container; and a removeable lid that fits directly on the outer container while the inner container is inside the outer container and the removeable lid conceals the cavity in the outer container;
(b.) placing a plastic bag between the inner container and the outer container;
(c.) obtaining the removeable lid;
(d.) placing an item on top ofthe removeable lid toform a handle;
(e.) placing waste into the plastic bag inside the inner container
(f.) removing the plastic bag; and
(g.) cleaning the outer and inner cleaner.

10. The method of claim 9, wherein the storage container further comprises an ornamental tree that is attached to the removeable lid to substantially cover top of the removeable lid.

11. The method of claim 10, wherein the storage container further comprises at least one handle attached to the removeable lid.

12. The method of claim 11, wherein at least a portion of the handle is inside the ornamental tree.

13. The method of claim 9, wherein the outer container is a flowerpot and the removeable lid is an inverted saucer pan for the flowerpot and the inner container is a nursey pot.

14. The method of claim 9, wherein the storage container further comprises a plurality of holes in the outer container, wherein the holes allow for quicker off-gassing of items in the cavity.

15. The method of claim 14, wherein the plurality of holes are least 3 holes at 120 degrees angles to each other in a side of the outer container.

16. The method of claim 14, wherein the plurality of holes are four holes at 90-degree angels to each other on the circumference allowing for quick and even distribution on the off-gassing and odor control.

17. A method for manufacturing a storage container, comprising:
(a.) obtaining aflowerpot;

(b.) drilling at least one hole into the side of an outer container;

(c.) obtaining an inner container smaller than the outer container;

(d.) placing the inner container inside the outer container; and (e.) creating holes on a bottom of the inner container and outer container to create the storage container comprising the outer container with a cavity inside the outer container, wherein the outer container comprises a base with a drain, wherein the drain is a hole on the base and the base is located on lowermost portion of the outer container; the inner container that is smaller than the outer container is placed completely inside the cavity of the outer container, wherein the inner container comprises at least one hole on the bottom for drainage, wherein the bottom is the lowermost portion of the inner container; and a removeable lid that fits directly on the outer container while the inner container is inside the outer container and the removeable lid conceals the cavity in the outer container.

18. The method for manufacturing a storage container of claim 17, further comprising creating a plurality of holes in the outer container, wherein the holes allow for quicker off-gassing of items in the cavity.

19. The method for manufacturing a storage container of claim 18, wherein the plurality of holes are four holes at 90-degree angels to each other on the circumference allowing for quick and even distribution on the off-gassing and odor control.

20. The storage apparatus of claim 1, further comprising a plastic bag inside the inner container.

21. The storage apparatus of claim 1, further comprising a gap between the inner container and the outer container and the gap between the inner container and the outer container is at least ½ inch and no more than 4 inches to fit a plastic bag.

22. The storage apparatus of claim 1, wherein the inner container is secured to the outer container by a fastener.

23. The storage apparatus of claim 21, wherein the inner container is secured to the outer container by a removable screw.

24. The storage apparatus of claim 20, wherein part of the plastic bag is between the outer container and the inner container.

25. The storage apparatus of claim 20, wherein the removeable lid is at least one inch from the top of the outer container.

26. The storage apparatus of claim 1, further comprising a gap between the inner container and the outer container and the gap between the inner container and the outer container is at least ½ inch and no more than 4 inches, wherein the inner container is secured to the outer container by a removeable screw, wherein part ofthe plastic bag is between the outer container and the inner container, and wherein the removeable lid is at least one inch from the top end of the outer container.

27. The storage apparatus of claim 1, wherein the removeable lid is not fastened to the outer container to permit quick removal.

28. The storage apparatus of claim 1, wherein the inner container is placed inside the outer container without securing the inner container to permit simple removal of the inner container.

29. The storage apparatus of claim 1, further comprises one or more holes in the exterior of the inner container, wherein the exterior of the inner container is a sloped side wall.

30. The storage apparatus of claim 1, wherein the at least one hole on the bottom for drainage on the inner container is larger than ⅛ inch and less than 1 inch to allow for quicker off-gassing, wherein the bottom is the lowermost portion of the inner container.

* * * * *